United States Patent
Shimizu et al.

(10) Patent No.: US 10,207,687 B1
(45) Date of Patent: Feb. 19, 2019

(54) SYSTEMS, VEHICLES, AND METHODS FOR CONTROLLING TRAILER BRAKE OUTPUT CIRCUITS WITH A REDUCED UPPER LIMIT OF TRAILER BRAKE OUTPUT SIGNALS

(71) Applicant: Toyota Motor Engineering & Manufacturing North America, Inc., Erlanger, KY (US)

(72) Inventors: Yuichi Shimizu, Ann Arbor, MI (US); Lisa DiMaggio, Ann Arbor, MI (US); Mikhal el Arculli, Celina, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 15/674,341

(22) Filed: Aug. 10, 2017

Related U.S. Application Data (60) Provisional application No. 62/541,358, filed on Aug. 4, 2017.

(51) Int. Cl.
| | |
|---|---|
| *B60T 8/17* | (2006.01) |
| *B60T 7/20* | (2006.01) |
| *B60T 7/08* | (2006.01) |
| *B60T 7/22* | (2006.01) |
| *B60T 8/24* | (2006.01) |
| *B60T 13/66* | (2006.01) |

(52) U.S. Cl.
CPC ............ *B60T 8/1708* (2013.01); *B60T 7/085* (2013.01); *B60T 7/20* (2013.01); *B60T 7/22* (2013.01); *B60T 8/248* (2013.01); *B60T 13/662* (2013.01)

(58) Field of Classification Search
CPC .......... B60T 8/1708; B60T 7/085; B60T 7/20; B60T 7/22; B60T 8/248; B60T 13/662
USPC .......................................................... 701/70
See application file for complete search history.

(56) References Cited

U.S. PATENT DOCUMENTS

| | | | |
|---|---|---|---|
| 3,895,683 A | 7/1975 | Lang et al. | |
| 4,804,234 A * | 2/1989 | Gee ........................... | B60T 7/20 188/112 R |
| 7,137,674 B2 * | 11/2006 | Goebels ................... | B60Q 1/22 303/191 |
| 7,925,409 B2 | 4/2011 | Fry et al. | |
| (Continued) | | | |

FOREIGN PATENT DOCUMENTS

EP              2433839 B1     10/2012

*Primary Examiner* — Marthe Y Marc-Coleman
(74) *Attorney, Agent, or Firm* — Dinsmore & Shohl LLP (57) ABSTRACT

A system for controlling a trailer brake output circuit includes an input device outputting a signal in response to receiving an input from a user, and an electronic control unit. The electronic control unit includes one or more processors, one or more memory modules, the trailer brake output circuit outputting a trailer brake output signal, and machine readable instructions. The electronic control unit receives the signal from the input device, limits the trailer brake output signal to a first value when the trailer brake output circuit outputs the trailer brake output signal in response to the signal received from the input device, and limits the trailer brake output signal to a second value when the trailer brake output circuit outputs the trailer brake output signal not in response to the signal received from the input device. The second value is smaller than the first value.

20 Claims, 6 Drawing Sheets

(56) References Cited

U.S. PATENT DOCUMENTS

| | | | |
|---|---|---|---|
| 2008/0172163 A1 | 7/2008 | Englert et al. | |
| 2008/0177454 A1 | 7/2008 | Bond et al. | |
| 2010/0192898 A1* | 8/2010 | Ni | F01M 1/16 123/196 R |
| 2013/0325209 A1* | 12/2013 | Cooper | B60T 7/20 701/2 |
| 2014/0046566 A1* | 2/2014 | Maitlen | B60T 8/1701 701/70 |
| 2016/0152222 A1* | 6/2016 | Lenz | B60T 8/5006 303/127 |
| 2017/0151935 A1 | 6/2017 | Prohaszka et al. | |

* cited by examiner

SYSTEMS, VEHICLES, AND METHODS FOR CONTROLLING TRAILER BRAKE OUTPUT CIRCUITS WITH A REDUCED UPPER LIMIT OF TRAILER BRAKE OUTPUT SIGNALS

CROSS-REFERENCE TO RELATED APPLICATIONS

This application claims the benefit of U.S. Provisional Application No. 62/541,358, entitled "SYSTEMS, VEHICLES, AND METHODS FOR CONTROLLING TRAILER BRAKE OUTPUT CIRCUITS WITH A REDUCED UPPER LIMIT OF TRAILER BRAKE OUTPUT SIGNALS," filed Aug. 4, 2017, the entirety of which is hereby incorporated by reference.

TECHNICAL FIELD

The present specification generally relates to trailer brake control systems and, more specifically, to systems for controlling trailer brake output circuits with a reduced upper limit of the trailer brake output signals.

BACKGROUND

Trailers (e.g., recreational trailers, utility trailers, boat trailers, semi-trailers, and the like) may be towed by towing vehicles (e.g., automobiles and trucks). Some trailers include trailer brakes that may be actuated by a trailer brake controller coupled to the towing vehicle. The trailer brake controller may control the trailer brakes via an electric-over-hydraulic trailer braking system or an electric trailer braking system.

An electric-over-hydraulic trailer braking system includes hydraulic trailer brakes and an electric-over-hydraulic brake actuator coupled to the trailer that receives electrical signals from the trailer brake controller and facilitates the application of the hydraulic trailer brakes.

An electric trailer braking system includes electric trailer brakes that are applied when the trailer brake controller provides an electric current to the trailer brakes. The electric trailer brakes typically include brake shoes that frictionally engage a drum when activated. In some electric trailer braking system, an electromagnet is mounted on one end of a lever in order to actuate the brake shoes. When an electric current is applied to the electromagnet, the lever is pivoted as the electromagnet is drawn against the rotating brake drum, thereby actuating the electric trailer brakes.

SUMMARY

In one embodiment, a system for controlling a trailer brake output circuit includes an input device configured to output a signal in response to receiving an input from a user, and an electronic control unit communicatively coupled to the input device. The electronic control unit includes one or more processors, one or more memory modules communicatively coupled to the one or more processors, the trailer brake output circuit communicatively coupled to the one or more processors and configured to output a trailer brake output signal, and machine readable instructions stored in the one or more memory modules. The machine readable instructions, when executed by the one or more processors, cause the electronic control unit to receive the signal from the input device, the signal being associated with the input from the user, limit the trailer brake output signal to a first value when the trailer brake output circuit outputs the trailer brake output signal in response to the signal received from the input device, and limit the trailer brake output signal to a second value when the trailer brake output circuit outputs the trailer brake output signal not in response to the signal received from the input device. The second value is smaller than the first value.

In another embodiment, a vehicle for controlling a trailer brake output circuit includes an input device configured to output a signal in response to receiving an input from a user, the trailer brake output circuit configured to output a trailer brake output signal, and an electronic control unit. The electronic control unit is configured to receive the signal from the input device, the signal being associated with the input from the user, limit the trailer brake output signal to a first value when the trailer brake output circuit outputs the trailer brake output signal in response to the signal received from the input device, and limit the trailer brake output signal to a second value when the trailer brake output circuit outputs the trailer brake output signal not in response to the signal received from the input device, the second value being smaller than the first value.

In yet another embodiment, a method of controlling a trailer brake output circuit of a vehicle includes receiving, by an electronic control unit of the vehicle, a signal from an input device of the vehicle, the signal being associated with an input to the input device by a user, limiting, by the electronic control unit of the vehicle, a trailer brake output signal to a first value when the trailer brake output circuit outputs the trailer brake output signal in response to the signal received from the input device, and limiting, by the electronic control unit of the vehicle, the trailer brake output signal to a second value when the trailer brake output circuit outputs the trailer brake output signal not in response to the signal received from the input device, the second value being smaller than the first value.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
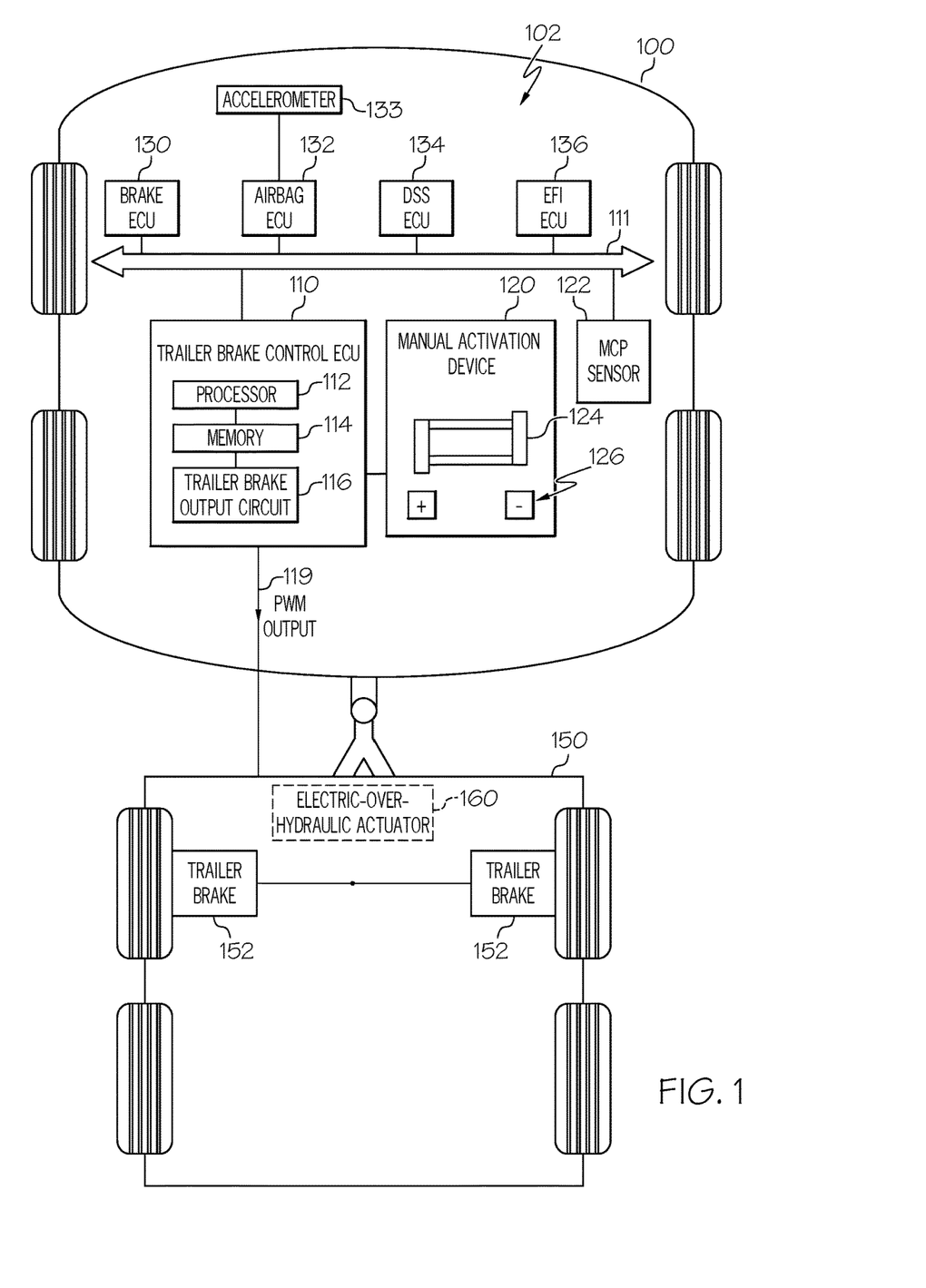
FIG. 1 schematically depicts a vehicle including a trailer brake control system coupled to a trailer including trailer brakes, according to one or more embodiments shown and described herein.

The embodiments disclosed herein include systems for controlling trailer brake output circuits with a reduced upper limit of the trailer brake output signals. Referring generally to FIGS. 1, 2D, and 3B, a system for controlling a trailer brake output circuit includes an input device configured to output a signal in response to receiving an input from a user, and an electronic control unit communicatively coupled to the input device. The electronic control unit includes one or more processors, one or more memory modules communicatively coupled to the one or more processors, the trailer brake output circuit communicatively coupled to the one or more processors and configured to output a trailer brake output signal, and machine readable instructions stored in the one or more memory modules. The machine readable instructions, when executed by the one or more processors, cause the electronic control unit to receive the signal from the input device, the signal being associated with the input from the user, limit the trailer brake output signal to a first value when the trailer brake output circuit outputs the trailer brake output signal in response to the signal received from the input device, and limit the trailer brake output signal to a second value when the trailer brake output circuit outputs the trailer brake output signal not in response to the signal received from the input device. The second value is smaller than the first value. The various systems for controlling trailer brake output circuits with a reduced upper limit of the trailer brake output signals will be described in more detail herein with specific reference to the corresponding drawings.

Referring now to FIG. 1, an embodiment of a towing vehicle 100 including a system 102 for controlling an application of a plurality of trailer brakes 152 of a trailer 150 connected to the towing vehicle 100 is schematically depicted. The towing vehicle 100 may be an automobile or any other passenger or non-passenger vehicle such as, for example, a tractor or a tractor truck.

The trailer 150 may be any unpowered vehicle including one or more wheels capable of being pulled by the towing vehicle 100 such as, for example, a recreational trailer, a utility trailer, a boat trailer, a semi-trailer, and the like. As depicted in FIG. 1, the plurality of trailer brakes 152 includes two trailer brakes, one coupled to each wheel of the front axle. However, it should be understood that in other embodiments, the plurality of trailer brakes 152 may include more than two trailer brakes, such as in embodiments in which the plurality of trailer brakes 152 includes multiple axles with two trailer brakes associated with each axle. In some embodiments in which the trailer 150 employs an electric-over-hydraulic braking system, the plurality of trailer brakes 152 may be a plurality of hydraulic trailer brakes and the trailer 150 may include an electric-over-hydraulic actuator 160 that receives an electrical activation signal from the system 102 and transforms the received electrical activation signal to a hydraulic pressure that activates the plurality of hydraulic trailer brakes, as will be described in further detail below. In embodiments in which the trailer 150 employs an electric braking system, the plurality of trailer brakes 152 may be a plurality of electric trailer brakes and the trailer 150 may not include the electric-over-hydraulic actuator 160.

The system 102 includes a communication path 111, a trailer brake control electronic control unit (ECU) 110, a brake ECU 130, an airbag ECU 132, an accelerometer 133, a driving support system (DSS) ECU 134, an electronic fuel injection (EFI) ECU 136, a manual activation device 120, and a master cylinder pressure sensor 122. The trailer brake control ECU 110 includes one or more processors 112, one or more memory modules 114, and a trailer brake output circuit 116. The various components of the system 102 and the interaction thereof will be described in detail below.

The communication path 111 may be formed from any medium that is capable of transmitting a signal such as, for example, conductive wires, conductive traces, optical waveguides, or the like. Moreover, the communication path 111 may be formed from a combination of mediums capable of transmitting signals. In one embodiment, the communication path 111 comprises a combination of conductive traces, conductive wires, connectors, and buses that cooperate to permit the transmission of electrical data signals to components such as processors, memories, sensors, input devices, output devices, and communication devices. Accordingly, the communication path 111 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 111 communicatively couples the various components of the system 102. As used herein, the term "communicatively coupled" means that coupled components are capable of exchanging data signals with one another such as, for example, electrical signals via conductive medium, electromagnetic signals via air, optical signals via optical waveguides, and the like.

The trailer brake control ECU 110 receives input from other ECUs (e.g., the brake ECU 130, the Airbag ECU 132, the DSS ECU 134, the EFI ECU 136), the manual activation device 120, and/or the master cylinder pressure (MCP) sensor 122, and outputs a trailer brake output signal 119, e.g., a pulse-width modulation signal, based on the received input.

Each of the one or more processors 112 of the trailer brake control ECU 110 may be any device capable of executing machine readable instructions. Accordingly, each of the one or more processors 112 may be a controller, an integrated circuit, a microchip, a computer, or any other computing device. The one or more processors 112 are communicatively coupled to the other components of the system 102 by the communication path 111. Accordingly, the communication path 111 may communicatively couple any number of processors with one another, and allow the components coupled to the communication path 111 to operate in a distributed computing environment. Specifically, each of the components may operate as a node that may send and/or receive data.

Each of the one or more memory modules 114 of the system 102 is coupled to the communication path 111 and communicatively coupled to the one or more processors 112. The one or more memory modules 114 may comprise RAM, ROM, flash memories, hard drives, or any device capable of storing machine readable instructions such that the machine readable instructions can be accessed and executed by the one or more processors 112. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 114. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring to FIG. 1, the trailer brake output circuit 116 is coupled to the communication path 111 and communicatively coupled to the one or more processors 112. In embodiments in which the trailer 150 employs an electric trailer braking system, the trailer brake output circuit 116 is electrically coupled to the plurality of trailer brakes 152 by a conductive medium, such as a conductive wire. In embodiments in which the trailer 150 employs an electric-over-hydraulic braking system, the trailer brake output circuit 116 is electrically coupled to the electric-over-hydraulic actuator 160 by a conductive medium, such as a conductive wire. The trailer brake output circuit 116 is controlled by the one or more processors 112 and supplies a trailer brake output signal, such as a voltage or current, directly to the plurality of trailer brakes 152 (in embodiments in which the trailer 150 employs an electric braking system) or to the electric-over-hydraulic actuator 160 (in embodiments in which the trailer 150 employs an electric-over-hydraulic braking system) via the conductive medium when commanded by the one or more processors 112. The trailer brake output signal may be controlled based on one or more signals output by the manual activation device 120, a signal output by the MCP sensor 122, and/or one or more signals output by the brake ECU 130, the Airbag ECU 132, the DSS ECU 134, and/or the EFI ECU 136. In some embodiments, the trailer brake output circuit 116 may supply current from the power system of the towing vehicle 100. The trailer brake output circuit 116 generally includes one or more electrical components, such as resistors, capacitors, transistors, inductors, and the like. In some embodiments, the trailer brake output circuit 116 may include at least one power transistor, such as a MOSFET transistor.

Still referring to FIG. 1, in some embodiments, the trailer brake output circuit 116 outputs a trailer brake output signal in response to a pulse-width modulated trailer brake output command signal having a duty cycle. In such embodiments, the trailer brake output circuit 116 may generate the trailer brake output signal in proportion to the duty cycle of the pulse-width modulated trailer brake output command signal. However, it should be understood that in other embodiments, the trailer brake output circuit 116 may output the trailer brake output signal in response to a trailer brake output command signal having a waveform other than a pulse-width modulated waveform.

Still referring to FIG. 1, the manual activation device 120 includes a slider 124 and gain pushbuttons 126. The manual activation device 120 is configured to output a signal including a position of the slider 124 and activation of the gain pushbuttons 126. In some embodiments, the output signal of the manual activation device 120 is received by the trailer brake control ECU 110, which may generate a trailer brake output signal with the trailer brake output circuit 116 based on the position of the slider 124 and/or a system gain determined based on activation of the gain pushbuttons 126. A driver of the towing vehicle 100 may demand greater trailer brake control output by increasing the gain set by the slider 124 and/or the gain pushbuttons 126.

Still referring to FIG. 1, the master cylinder pressure (MCP) sensor 122 is coupled to the communication path 111 and communicatively coupled to the trailer brake control ECU 110. The trailer brake control ECU 110 may control the trailer brake output circuit 116 based on a master cylinder pressure determined by the brake ECU 130 based on an output of the MCP sensor 122. A driver of the towing vehicle 100 may demand greater trailer brake control output by pressing the brake pedal, which is sensed by the MCP sensor 122.

The brake ECU 130 is communicatively coupled to the communication path 111. The brake ECU 130 is configured to control activation of the vehicle brakes. The brake ECU 130 is configured to transmit a trailer sway control (TSC) flag indicating that a vehicle TSC mode is active or a TSC flag indicating that a vehicle TSC mode is inactive to the trailer brake control ECU 110. The trailer brake control ECU 110 operates under a TSC mode or non-TSC mode based on the TSC flag received from the brake ECU 130. The brake ECU 130 may include one or more processors similar to one or more processors 112 of the trailer brake control ECU 110 and one or more memory modules similar to one or memory modules 114 of the trailer brake control ECU 110.

The airbag ECU 132 is communicatively coupled to the communication path 111 and to the accelerometer 133. The airbag ECU 132 is configured to control activation of the airbag and to transmit a vehicle acceleration message to other components of the towing vehicle 100 via the communication path 111. The accelerometer 133 is a device configured to generate an output signal proportional to vehicle acceleration or deceleration. The airbag ECU 132 determines the vehicle acceleration message to transmit to the communication path 111 based on the output signal of the accelerometer 133. In some embodiments, zero point logic may be employed to the accelerometer value to decrease variability in the sensor value, such as by determining an accelerometer value when a driver is judged to begin braking (e.g., based on master cylinder pressure), and then determining future accelerometer values relative to the accelerometer value when the driver began braking. The airbag ECU 132 may include one or more processors similar to one or more processors 112 of the trailer brake control ECU 110 and one or more memory modules similar to one or memory modules 114 of the trailer brake control ECU 110.

The DSS ECU 134 is communicatively coupled to the communication path 111. The DSS ECU 134 is configured to transmit a PCS flag indicating that a vehicle PCS mode is active to the trailer brake control ECU 110 when pre-collision safety function is activated, or transmit a PCS flag indicating that a vehicle PCS mode is inactive to the trailer brake control ECU 110 when pre-collision safety function is deactivated. The trailer brake control ECU 110 operates under a PCS mode or non-PCS mode based on the PCS flag received from the DSS ECU 134. The DSS ECU 134 may include one or more processors similar to one or more processors 112 of the trailer brake control ECU 110 and one or more memory modules similar to one or memory modules 114 of the trailer brake control ECU 110.

The EFI ECU 136 is communicatively coupled to the communication path 111. The EFI ECU 136 is configured to transmit an adaptive cruise control (ACC) flag indicating that a vehicle ACC mode is active, or an ACC flag indicating that a vehicle ACC mode is inactive to the trailer brake control ECU 110, such that the trailer brake control ECU 110 operates under a ACC mode or non-ACC mode. The EFI ECU 136 may include one or more processors similar to one or more processors 112 of the trailer brake control ECU 110 and one or more memory modules similar to one or memory modules 114 of the trailer brake control ECU 110.

Figure 2A:
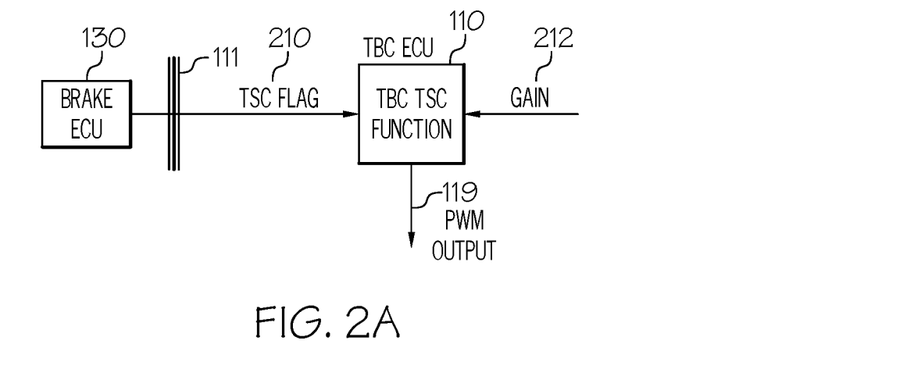
FIG. 2A schematically depicts operations of a trailer brake control ECU when a trailer sway control (TSC) function is activated, according to one or more embodiments shown and described herein.
Figure 2B:
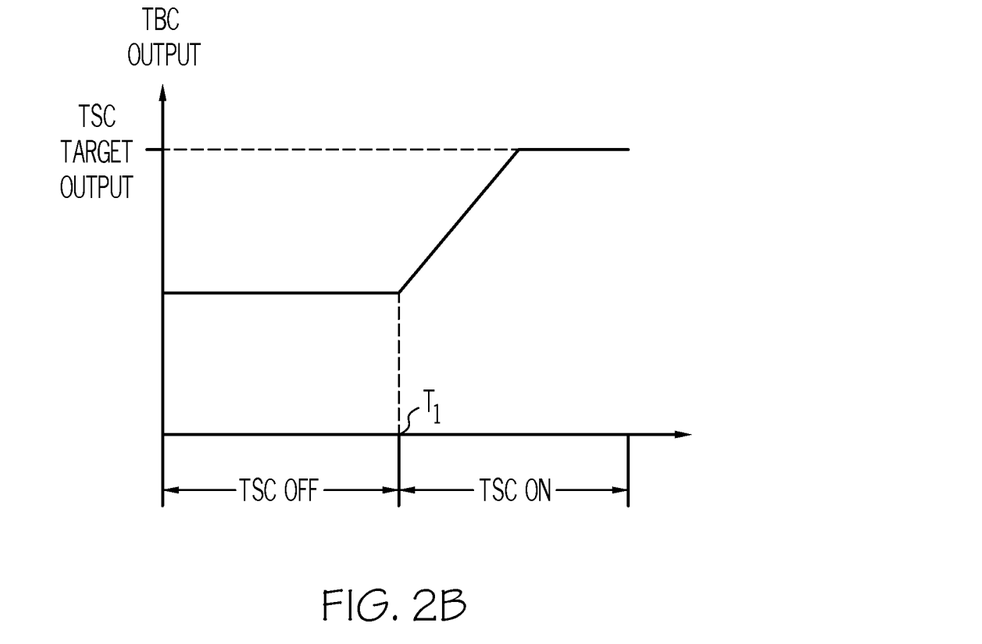
FIG. 2B depicts a graph illustrating the change of a trailer brake control target output when the TSC function is activated, according to one or more embodiments shown and described herein.

FIG. 2A schematically depicts operations of the trailer brake control ECU 110 when a trailer sway control (TSC) function is activated. The TSC function reduces trailer sway duration of the trailer being towed by a vehicle. In some embodiments, when the TSC function is activated, the operation of trailer brakes is smooth and prevents an abrupt feeling. In embodiments, the trailer brake control ECU 110 receives a TSC flag 210 indicating that a vehicle TSC mode is ON from the brake ECU 130. When the TSC mode is ON, the trailer brake control ECU 110 outputs a trailer brake output signal 119 based on a TSC function target output. For example, as shown in FIG. 2B, when the vehicle TSC mode is ON at time t1, the trailer brake control target output is increased to a TSC function target output.

Figure 2C:
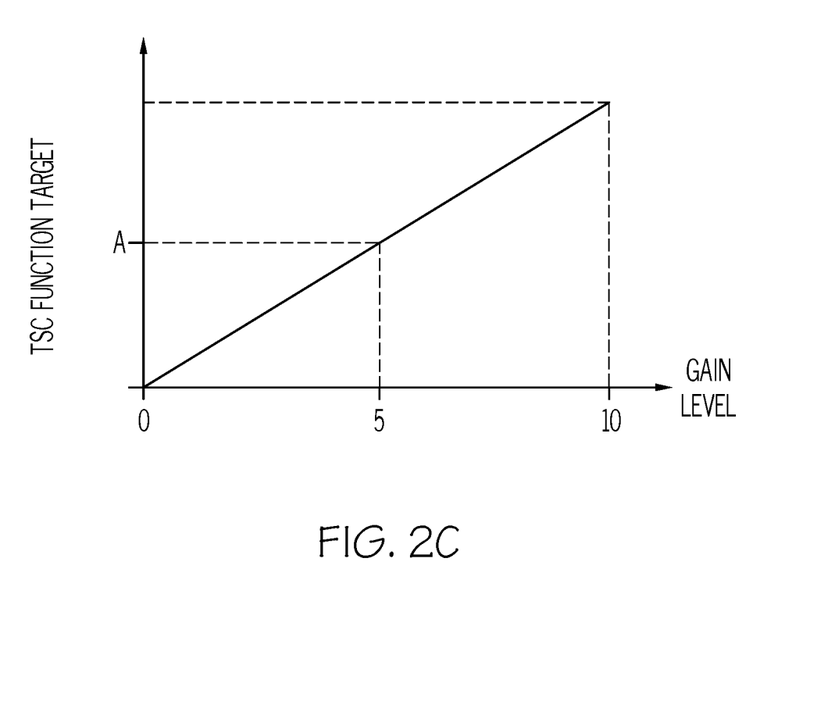
FIG. 2C depicts a graph illustrating a TSC function target output that is a function of a gain level, according to one or more embodiments shown and described herein.
Figure 2D:
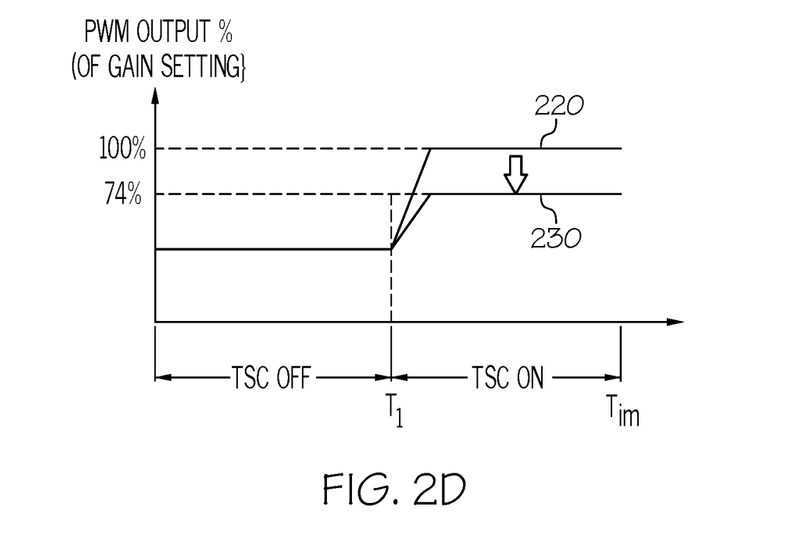
FIG. 2D depicts limiting a maximum output of the trailer brake output circuit to a reduced level when the TSC function is ON and the trail brake output is not the result of a driver action, according to one or more embodiments shown and described herein.

The TSC function target output is a function of a gain 212 that may be received from the manual activation device 120. In some embodiments, the gain 212 may be pre-stored in the one or more memory modules 114 of the trailer brake control ECU 110. FIG. 2C depicts the TSC function target output that is a function of a gain. In embodiments, the gain may be adjustable from 0 to 10, in increments of 0.5. Although FIG. 2C illustrates the gain having a range of 0 to 10, a different gain range and/or an increment value may be used for gain settings.

FIG. 2D depicts limiting a maximum output of the trailer brake output circuit 116 when the TSC function is ON and the trail brake output is not the result of a driver action (i.e., driver not in the loop). The trailer brake control ECU 110 determines whether a driver is in the loop or not based on one or more inputs from the manual activation device 120 and/or the MCP sensor 122. For example, if the trailer brake control ECU 110 receives an output signal from the MCP sensor 122 indicating that vehicle brakes are being activated by the driver, the trailer brake control ECU 110 determines that the a driver is in the loop (i.e., the trailer brake control output is controlled by a driver pressing the brake pedal). As another example, if the trailer brake control ECU 110 receives an output signal from the manual activation device 120 that is associated with a change in the position of the slider 124 or the activation of the gain pushbuttons 126, the trailer brake control ECU 110 determines that the a driver is in the loop (i.e., the trailer brake control output is controlled by a driver action manipulating the manual activation device 120). In contrast, if the trailer brake control ECU 110 does not receive an output signal from the MCP sensor 122 indicating that vehicle brakes are being activated by the driver, nor an output signal from the manual activation device 120 that is associated with a change in the location of the slider 124 or the activation of the gain pushbuttons 117, the trailer brake control ECU 110 determines that the a driver is not in the loop (i.e., the trailer brake control output is determined without the driver's intervention).

When a driver is in the loop, the trailer brake control ECU 110 limits the trailer brake output signal 119 (e.g., the PWM output) to a first maximum allowable output (e.g., a first value 220), as shown in FIG. 2D. The first value 220 may be a maximum value that is determined based on the gain setting according to the graph in FIG. 2C. For example, if the gain is set to 5 as shown in FIG. 2C, the maximum value will be a value A which is a TSC function target output corresponding to a gain of 5.

When a driver is not in the loop, the trailer brake control ECU 110 limits the trailer brake output signal 119 (e.g., the PWM output) to a second maximum allowable output (e.g., a second value 230) as shown in FIG. 2D. The second value is lower than the first value 220 by a predetermined amount. For example, the second value 230 is about 26% to 50% less than the first value 220 in some embodiments. The trailer brake control ECU 110 limits the trailer brake output signal to the second value which is smaller than the first value 230 in order to prevent the trailer brakes from locking up. Locking up in the trailer brakes may occur when lateral slip of the trailer is not accounted for during a gain setting. That is, the maximum output trailer brake output signal should be reduced to a lesser value that accounts for the lateral slip of the trailer in order to prevent locking up in the trailer brakes.

When a driver is in the loop, the driver may address the lock-up in the trailer brakes 152 by manipulating the manual activation device 120 or pressing a brake pedal. In contrast, when a driver is not in the loop, the maximum trailer brake output signal allowed when the driver is in the loop (e.g., the first value 220), which will not be reduced by the driver, may cause lock-up in the trailer brakes 152, and lock-up in the trailer brakes 152 may continue. In this regard, in order to address the potential lock-up in the trailer brakes 152 when the driver is not in the loop, the trailer brake control ECU 110 limits the trailer brake output signal 119 to the second value 230 that is lower than the first value 220.

Figure 3A:
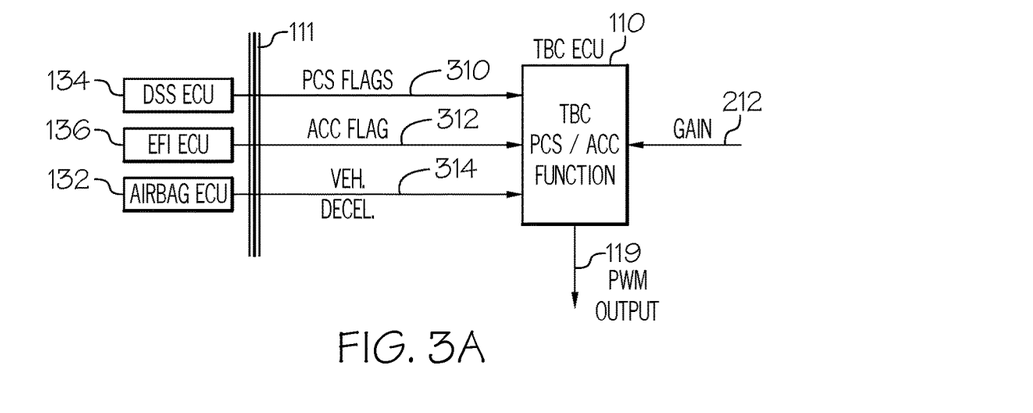
FIG. 3A schematically depicts operations of the trailer brake control ECU pre-collision safety (PCS) function or adaptive cruise control (ACC) is activated, according to one or more embodiments shown and described herein.
Figure 3B:
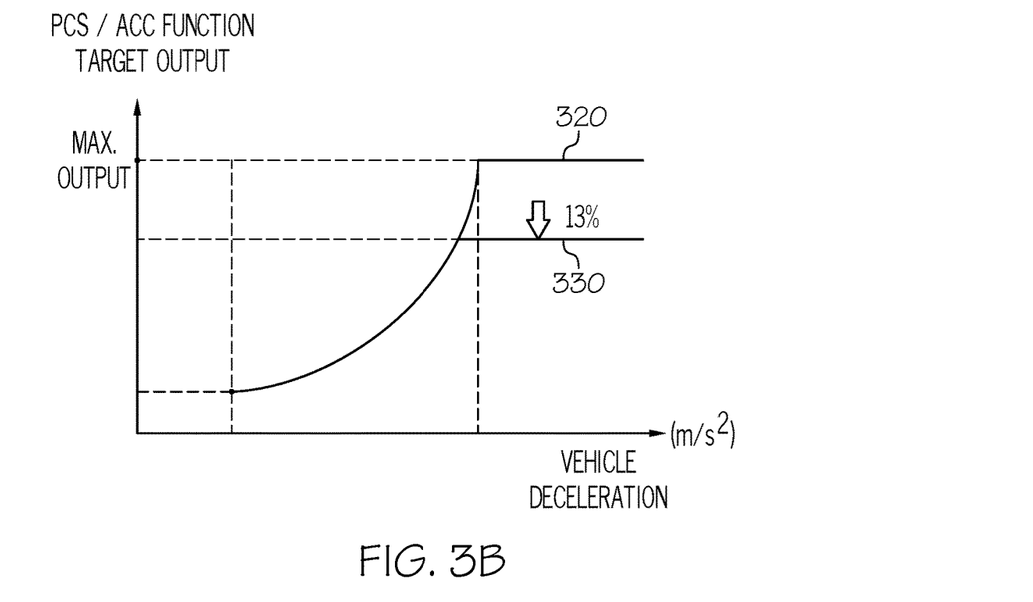
FIG. 3B depicts limiting a maximum output of the trailer brake output circuit to a reduced level when the PCS/ACC function is ON and the trail brake output is not the result of a driver action, according to one or more embodiments shown and described herein.

FIG. 3A schematically depicts operations of the trailer brake control ECU 110 when a pre-collision safety (PCS) function or adaptive cruise control (ACC) is activated. The PCS/ACC function utilizes trailer brakes in addition to vehicle brakes in order to reduce stopping distance. In some embodiments, when the PCS/ACC function is activated, the operation of trailer brakes is smooth and prevents an abrupt feeling. In embodiments, the trailer brake control ECU 110 receives a PCS flag 310 indicating that a vehicle PCS mode is ON from the DSS ECU 134. The trailer brake control ECU 110 receives an ACC flag 312 indicating that a vehicle ACC mode is ON from the EFI ECU 136. The trailer brake control ECU 110 also receives a deceleration value 314 from the airbag ECU 132 (e.g., based on a signal transmitted by the accelerometer 133. When the vehicle PCS mode is ON or the vehicle ACC mode is ON, the trailer brake control ECU 110 outputs the trailer brake output signal 119 based on PCS/ACC function target output. The PCS/ACC function target output is a function of a vehicle deceleration that may be received from the airbag ECU 132.

FIG. 3B depicts limiting maximum output of the trailer brake output circuit 116 to a reduced value when the PCS/ACC function is ON and the trail brake output is not the result of a driver action (i.e., driver not in the loop). The trailer brake control ECU 110 determines whether a driver is in the loop or not based on one or more inputs from the manual activation device 120 and/or the MCP sensor 122. For example, if the trailer brake control ECU 110 receives an output signal from the MCP sensor 122 indicating that vehicle brakes are being activated by a driver, the trailer brake control ECU 110 determines that the a driver is in the loop (i.e., the trailer brake control output is controlled by a driver action pressing the brake pedal). As another example, if the trailer brake control ECU 110 receives an output signal from the manual activation device 120 that is associated with a change in the position of the slider 124 or the activation of the gain pushbuttons 126, the trailer brake control ECU 110 determines that the a driver is in the loop (i.e., the trailer brake control output is controlled by a driver action manipulating the manual activation device 120). In contrast, if the trailer brake control ECU 110 does not receive an output signal from the MCP sensor 122 indicating that vehicle brakes are being activated by a driver, nor an output signal from the manual activation device 120 that is associated with a change in the location of the slider 124 or the activation of the gain pushbuttons 117, the trailer brake control ECU 110 determines that the a driver is not in the loop (i.e., the trailer brake control output is determined without the driver's intervention).

Figure 4:
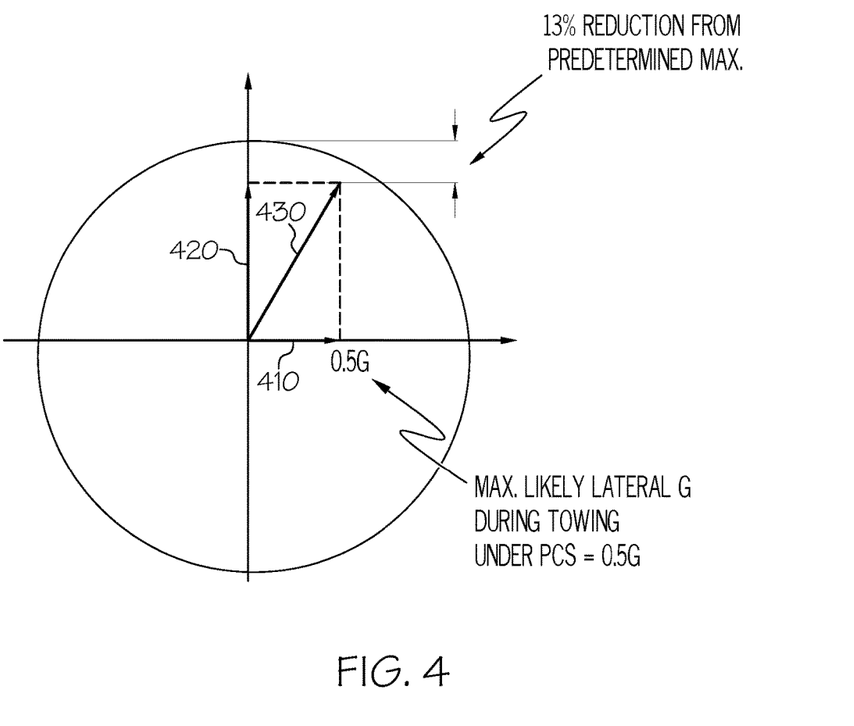
FIG. 4 depicts a lateral G and a longitudinal G of a trailer during towing when the PCS/ACC function is ON, according to one or more embodiments shown and described herein.

When a driver is in the loop, the trailer brake control ECU 110 limits the trailer brake output signal 119 (e.g., the PWM output) to maximum allowable output (e.g., a first value 320) as shown in FIG. 3B. The first value may be a maximum amount that is determined based on the gain setting according to the graph in FIG. 2C. When a driver is not in the loop, the trailer brake control ECU 110 limits the trailer brake output signal 119 (e.g., the PWM output) to a second value 330 as shown in FIG. 3B. In some embodiments, the second value is smaller than the first value 320 by a predetermined amount. For example, the second value 330 is about 13% less than the first value 220. The trailer brake control ECU 110 limits the trailer brake output signal to the second value 330 that is lower than the first value 320 in order to prevent the trailer brakes from locking up. Locking up in the trailer brakes 152 may occur when lateral trailer force consumption is not accounted for during a gain setting. That is, the maximum output trailer brake output signal should be reduced to a lesser value that accounts for the lateral trailer force consumption in order to prevent locking up in the trailer brakes. In some embodiments, a tire friction circle may be used to determine the reduction in the predetermined amount. For example, in FIG. 4, a trailer force 430 consists of a lateral G 410 and a longitudinal G 420. The maximum possible lateral G for a trailer during towing may be about 0.5G. This maximum possible lateral G consumption during PCS function should be considered to prevent the trailer brakes 152 from locking up. Thus, a brake force related to the longitudinal G 420 should be reduced by about 13% from a predetermined maximum trailer brake control output as shown in FIG. 4.

When a driver is in the loop, the driver may address the lock up in the trailer brakes 152 by manipulating the manual activation device 120 or pressing a brake pedal to adjust the trailer brake output signal. In contrast, when a driver is not in the loop, the maximum trailer brake output signal allowed when the driver is in the loop (e.g., the first value 320), which will not be reduced by the driver, may cause lock up in the trailer brakes 152, and the lock up may continue. In this regard, in order to address the potential locking up in the trailer brakes 152 when the driver is not in the loop, the trailer brake control ECU 110 limits the trailer brake output signal to the second value 330 that is lower than the first value 320.

Figure 5:
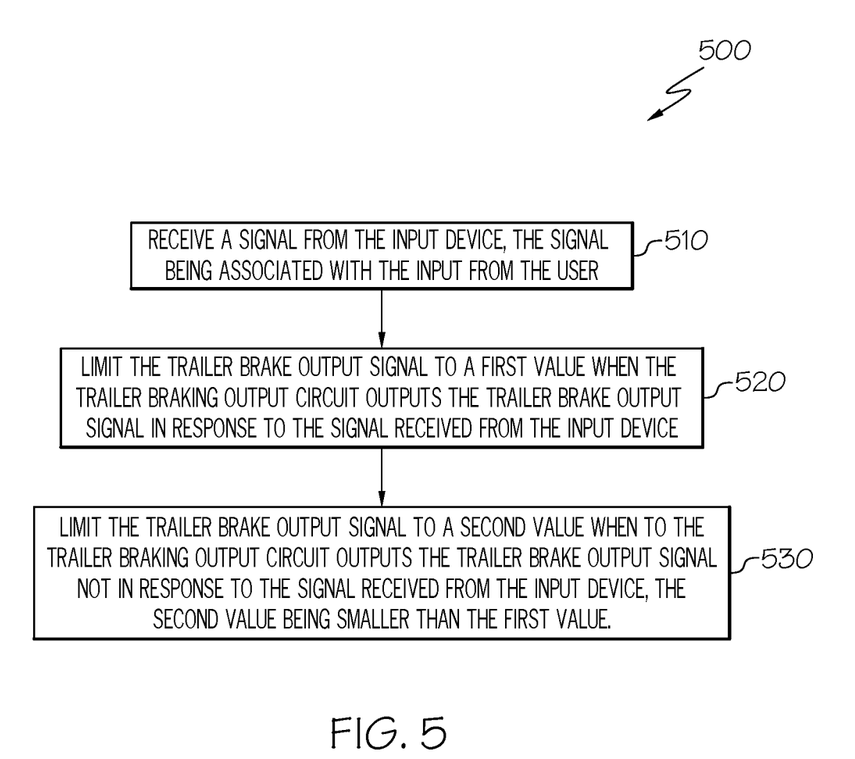
FIG. 5 depicts a flowchart of a method for controlling a trailer brake output circuit, according to one or more embodiments shown and described herein.

FIG. 5 depicts a flowchart of a method 500 for controlling a trailer brake output circuit, according to one or more embodiments shown and described herein. Referring now to FIGS. 1 and 5, at block 510, the trailer brake control ECU 110 receives a signal from an input device that is associated with an input to the input device by a driver. In embodiments, the input device may be the manual activation device 120. When the driver manipulates the slider 124 or the gain pushbuttons 126, the slider 124 or the gain pushbuttons 126 outputs to the trailer brake control ECU 110 a signal that is associated with the driver's input to the slider 124 or the gain pushbuttons 126. Then, the trailer brake control ECU 110 may determine that a driver is in the loop. In some embodiments, the input device may be the MCP sensor 122. When the driver press a brake pedal, the MCP sensor 122 outputs a signal that is associated with the driver's input to the MCP sensor 122. Then, the trailer brake control ECU 110 may determine that a driver is in the loop.

At block 520, the trailer brake control ECU 110 limits the trailer brake output signal to a first value when the trailer brake output circuit 116 outputs the trailer brake output signal in response to the signal received from the input device. For example, when the trailer brake control ECU 110 receives a signal indicating a gain change from the manual activation device 120 (i.e., a driver is in the loop), the trailer brake control ECU 110 limits the trailer brake output signal to maximum allowable output that is based on a gain setting, e.g., the value 220 in FIG. 2D, the first value 320 in FIG. 3B, etc. Thus, the trailer brake output signal by the trailer brake output circuit 116 is limited to the maximum allowable output.

At block 530, the trailer brake control ECU 110 limits the trailer brake output signal to a second value when the trailer brake output circuit 116 outputs the trailer brake output signal not in response to the signal received from the input device. The second value is lower than the first value by a predetermined amount. For example, the second value 230 is about 26% to 50% less than the first value 220 when a TSC function is activated for the vehicle. The trailer brake control ECU 110 limits the trailer brake output signal to the second value which is smaller than the first value 230 in order to prevent the trailer brakes from locking up. As another example, the second value 330 is about 13% less than the first value 320 when a PCS function is activated for the vehicle.

It should now be understood that embodiments described herein provide systems for controlling trailer brake output circuits with a reduced upper limit of the trailer brake output signals. By limiting a trailer brake output signal to a certain value that is less than a predetermined maximum value when a driver is not in the loop, the systems described herein are more reliable and avoid problems of locking up in the trailer brakes due to excessive brake force applied to the trailer brakes.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for controlling a trailer brake output circuit, the system comprising:
   an input device configured to output a signal in response to receiving an input from a user; and
   an electronic control unit communicatively coupled to the input device, the electronic control unit comprising:
      one or more processors;
      one or more memory modules communicatively coupled to the one or more processors;
      the trailer brake output circuit communicatively coupled to the one or more processors, wherein the trailer brake output circuit is configured to output a trailer brake output signal; and
      machine readable instructions stored in the one or more memory modules that cause the electronic control unit to perform at least the following when executed by the one or more processors:
         receive the signal from the input device, the signal being associated with the input from the user;
         limit the trailer brake output signal to a first value when the trailer brake output circuit outputs the trailer brake output signal in response to the signal received from the input device; and
         limit the trailer brake output signal to a second value when the trailer brake output circuit outputs the trailer brake output signal independent of the signal received from the input device, the second value being smaller than the first value.

2. The system of claim 1, wherein the input device includes a master cylinder pressure communicatively coupled to the electronic control unit.

3. The system of claim 1, wherein the input device includes a manual activation device communicatively coupled to the electronic control unit, the manual activation device configured to transmit a gain for the trailer brake output signal to the electronic control unit.

4. The system of claim 3, wherein the machine readable instructions stored in the one or more memory modules cause the electronic control unit to activate a trailer sway control function,
   wherein the first value is determined based on the gain received from the manual activation device.

5. The system of claim 4, wherein the second value is about 26% to 50% less than the first value.

6. The system of claim 3, wherein the machine readable instructions stored in the one or more memory modules cause the electronic control unit to activate a pre-collision safety function,
   wherein the first value is determined based on the gain received from the manual activation device.

7. The system of claim 6, wherein the second value is about 13% less than the first value.

8. A vehicle for controlling a trailer brake output circuit, the vehicle comprising:
   an input device configured to output a signal in response to receiving an input from a user;
   the trailer brake output circuit configured to output a trailer brake output signal; and
   an electronic control unit configured to:
      receive the signal from the input device, the signal being associated with the input from the user;
      limit the trailer brake output signal to a first value when the trailer brake output circuit outputs the trailer brake output signal in response to the signal received from the input device; and
      limit the trailer brake output signal to a second value when the trailer brake output circuit outputs the trailer brake output signal independent of the signal received from the input device, the second value being smaller than the first value.

9. The vehicle of claim 8, wherein the input device includes a master cylinder pressure sensor communicatively coupled to the electronic control unit.

10. The vehicle of claim 8, wherein the input device includes a manual activation device communicatively coupled to the electronic control unit, the manual activation device configured to transmit a gain for the trailer brake output signal to the electronic control unit.

11. The vehicle of claim 10, wherein the electronic control unit is configured to activate a trailer sway control function, and the first value is determined based on the gain received from the manual activation device when the trailer sway control function is activated.

12. The vehicle of claim 11, wherein the second value is about 26% to 50% less than the first value.

13. The vehicle of claim 10, wherein the electronic control unit is configured to activate a pre-collision safety function, and the first value is determined based on the gain received from the manual activation device when the pre-collision safety function is activated.

14. The vehicle of claim 13, wherein the second value is about 13% less than the first value.

15. A method of controlling a trailer brake output circuit of a vehicle, the method comprising:
   receiving, by an electronic control unit of the vehicle, a signal from an input device of the vehicle, the signal being associated with an input to the input device by a user;
   limiting, by the electronic control unit of the vehicle, a trailer brake output signal to a first value when the trailer brake output circuit outputs the trailer brake output signal in response to the signal received from the input device; and
   limiting, by the electronic control unit of the vehicle, the trailer brake output signal to a second value when the trailer brake output circuit outputs the trailer brake output signal independent of the signal received from the input device, the second value being smaller than the first value.

16. The method of claim 15 wherein the input device includes a master cylinder pressure sensor communicatively coupled to the electronic control unit.

17. The method of claim 15, wherein the input device includes a manual activation device communicatively coupled to the electronic control unit, the manual activation device configured to transmit a gain for the trailer brake output signal to the electronic control unit.

18. The method of claim 17, further comprising activating a trailer sway control function,
   wherein the first value is determined based on the gain received from the manual activation device.

19. The method of claim 18, wherein the second value is about 26% to 50% less than the first value.

20. The method of claim 17, further comprising activating a pre-collision safety function, wherein the second value is about 13% less than the first value.

\* \* \* \* \*

UNITED STATES PATENT AND TRADEMARK OFFICE
CERTIFICATE OF CORRECTION

PATENT NO.         : 10,207,687 B1
APPLICATION NO.    : 15/674341
DATED              : February 19, 2019
INVENTOR(S)        : Yuichi Shimizu, Lisa DiMaggio and Mikhal el Arculli

Page 1 of 1

It is certified that error appears in the above-identified patent and that said Letters Patent is hereby corrected as shown below:

In the Claims

In Column 12, Line 52, Claim 16, before "wherein" insert --,--

Signed and Sealed this
Seventh Day of May, 2019

Andrei Iancu
*Director of the United States Patent and Trademark Office*